April 15, 1924.
L. H. MORSE
1,490,287
AUTOMATIC GAS VALVE
Filed Nov. 29, 1922
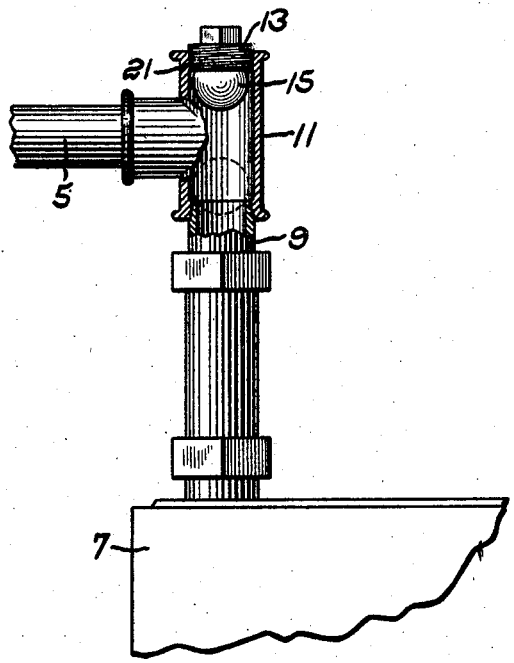
Inventor:
Lynn H. Morse, Patented Apr. 15, 1924.

1,490,287

UNITED STATES PATENT OFFICE.

LYNN H. MORSE, OF NATICK, MASSACHUSETTS, ASSIGNOR TO AUTOMATIC GAS VALVE COMPANY, OF BOSTON, MASSACHUSETTS, A CORPORATION OF MASSACHUSETTS.

AUTOMATIC GAS VALVE.

Application filed November 29, 1922. Serial No. 604,117.

*To all whom it may concern:*

Be it known that I, LYNN H. MORSE, a citizen of the United States, and a resident of Natick, in the county of Middlesex and Commonwealth of Massachusetts, have invented an Improvement in Automatic Gas Valves, of which the following description, in connection with the accompanying drawings, is a specification, like characters on the drawings representing like parts.

This invention relates to automatic gas valves, and more particularly to valves which are interposed between the main or service pipe and the gas meter, and so constructed as to cut off the supply of gas from the service pipe in case of an abnormal rise in temperature, such as would result from fire in the vicinity of the meter.

In the herein described embodiment of the invention, such valve comprises a valve member, preferably in the form of a ball, held suspended in a fitting between the service pipe and the meter and directly over the mouth of the pipe or conduit leading to the meter, the valve member being fastened by some fusible means. such as solder. having a relatively low melting point and susceptible to an abnormal rise in temperature so that, in case of fire, the ball is detached and drops on a valve seat which is formed by the open mouth of the conduit, thereby shutting off the flow of gas to the meter.

The ordinary T connection between the service pipe and the meter inlet provides a convenient location for such a ball valve, and the removable plug in the top of such T connection provides a member to which the ball may be conveniently attached by its fusible connection.

It has been found in practice, however, that there are certain practical objections to the use of such a valve. While it is necessary that the valve shall act with certainty under the influence of abnormal heat, it is equally desirable that it shall not act except in case of fire. The attachment of the ball through its fusible connection should be mechanically secure so as to insure against its dislodgment from the effect of extraneous jars or vibrations. Moreover, the ball and the fastening should not be affected by corrosion.

The threaded plug commonly used by plumbers and pipers comprises an exteriorly threaded shell-like member closed at its outer end and provided with a squared tip to receive a wrench. Where such a form of plug has been employed as a support for a ball-shaped valve member the mechanical strength of the fusible connection has been found insufficient to withstand severe jars or shocks. The ball being seated in the non-spherical cavity of the shell contacts therewith along the single line of contact and is attached thereto either by a ring of fusible solder or by a mass of solder filling the entire cavity. The soldering of a ball to a threaded plug of this description, particularly where a cast iron plug and a steel ball are used, is not only a slow and relatively expensive operation, but the strength of the fastening leaves it uncertain as to whether the ball, after the plug has been installed, will not drop from its seat under some sudden blow which the pipe may receive as an incident to its installation or in subsequent service, and this weakness is apt to become more marked under the corrosive action which follows long usage. If corroded, the ball, furthermore, will not accurately fit the valve seat.

Among the objects of the present invention is to greatly cheapen and facilitate the manufacture of such valves and to vastly increase the strength of the fusible fastening so as to render it practically immune against ordinary mechanical shocks and to protect the valve and its attachment against corrosion while maintaining such an attachment as permits the ball to drop with certainty from its support whenever the predetermined temperature is reached.

The invention will be best understood from the following description taken in connection with the accompanying drawings, while its scope will be more particularly pointed out in the appended claims.

In the drawings,—

Fig. 1 is an elevation partly in section showing an installation embodying one form of the invention;

Fig. 2 is a sectional elevation of the threaded plug shown in Fig. 1 which acts as a support for the ball valve; and Fig. 3 shows the ball valve seated in and attached to the threaded plug shown in Fig. 2.

Referring to the drawings and first to the general purpose of the invention, for the purposes of illustration I have shown the main or service pipe 5 for supplying gas to the meter 7 through the pipe 9 and T connection 11, all these fittings being of the common and usual construction. Into the upper end of the T 11 there is secured a plug 13 to which there is fastened, as hereinafter described, the ball valve 15, the attachment being by means of solder fusible at a low degree of heat. In case of fire the solder melts and the ball drops by gravity to its seat in the open mouth of the pipe 9, closing the passage thereto and preventing any further flow of gas from the service pipe 5 to the meter 7.

Any heavy, indestructible material may be used for the ball, but it is preferably of metal and also preferably of steel, since accurately shaped steel balls of any dimensions may be readily obtained. The plug 13 may also be of any suitable material, but for cheapness it is preferably made of cast iron. To provide a fastening between the ball and plug which will function only when and as required, the inner end of the plug is formed with a concave seat 17 which accurately fits the surface of the ball 15. For best results this should fit within one-one-hundredth of an inch so that the two parts may be united by an extremely thin film only of the solder but extending over a considerable area. Through the accurate fit and thin film of solder the mechanical strength of the joint is greatly increased and, at the same time, the valve functions with more certainty.

Where iron parts are fastened together, such as the steel ball and the cast iron plug, I preferably give the surface of each plug and ball which are designed to contact with each other, a coating of some kind which will facilitate soldering. I have found that by electro-plating both the cast iron plug and steel ball, there is not only provided a surface for each member which greatly facilitates the soldering, but it also provides a substantially non-corrosive surface for these parts.

After the plug 13, shaped as shown in Fig. 2, has been pipe-threaded at 21 and has been subjected to some such action as a sand blast preparatory to electro-plating, it is then electro-plated,—and preferably copper plated,—to give it a very thin copper plated surface. The steel ball 15 having been similarly copper plated, the parts are then ready for attachment. A relatively thin plating,— one one-thousandth of an inch for example, will ordinarily suffice, although thicker platings may be used.

With the parts thus prepared I found that they may be rapidly and inexpensively soldered and an unusually strong fastening secured by the following process. The plugs are first placed in rows, with the concave side up, on a rack, table or traveling apron. A very small amount of solder 23, together with a small amount of acid, or other suitable flux, is placed in the bottom of each concavity. For an ordinary three-quarters inch plug using a seven-eighths inch ball, a pound of solder will fasten more than five hundred balls to their respective plugs.

The balls being separately heated in an oven to a temperature substantially above the melting point of the solder used they are then picked up and dropped one by one each into a concave seat on one of the upstanding plugs, where by contact with the solder it quickly melts the same. The ball under its own weight is forced down into the closely fitting seat, squeezing the solder into a very thin film covering the entire surface of the seat. As the ball cools and the solder hardens, the latter is in the form of an extremely thin film, firmly uniting the ball over the entire area of the part which fits within the correspondingly shaped seat. Any solder fusible at the required temperature may be employed, the temperature commonly taken for this purpose being about 155°. Under the weight of the ball, however, the temperature at which the valve functions will be less than the melting point of the solder, and in a valve constructed as described with solder having a fusing point of 155°, the valve will drop when the temperature of substantially 130° is reached.

The functioning of the valve under the influence of heat is rendered more accurate by the described construction, for the solder being present in an extremely thin film between the closely adjacent bodies of the steel ball and the cast iron plug fuses instantaneously when the temperature of the plug or ball reaches the melting point of the solder.

Through the described process of constructing the plug and the valve, a fusible attachment is secured which is many times stronger in its resistance to mechanical shocks than that heretofore employed and the valve and its attachment is substantially impervious to corrosive action.

While I have herein shown and described for purposes of illustration one specific embodiment of the invention, it is to be understood that it is not limited to the details of procedure and construction herein specifically described.

Claims:

1. An automatic gas valve attachment comprising a gas outlet presenting a valve seat adapted to be closed by a ball valve, a gas inlet, a ball valve normally held above said seat, said attachment comprising also a support for said valve presenting a concave seat conforming substantially to the shape of the ball and in which a substantial part of the ball is seated, said ball being firmly attached and closely adherent to the walls of said seat through a thin film of fusible material, whereby the connection is sensitively responsive to a fusing heat to cause the ball to drop to its seat while being normally held effectively against dislodgment due to mechanical shocks.

2. An automatic gas valve attachment comprising a gas outlet presenting a valve seat adapted to be closed by a ball valve, a gas inlet, and an electro-plated metallic ball valve normally held above said seat, said attachment comprising also a support for said valve presenting a concave seat conforming substantially to the shape of the ball and in which a substantial part of the ball is seated, said ball being firmly attached and closely adherent to the walls of said seat through a thin film of fusible material, whereby the connection is sensitively responsive to a fusing heat to cause the ball to drop to its seat while being normally held effectively against dislodgment due to mechanical shocks.

3. An automatic gas valve attachment comprising a T-connection and presenting a gas outlet having a valve seat adapted to be closed by a ball valve, a gas inlet, a threaded metallic plug for the end of the T opposite the outlet, a ball valve normally held above said seat, the lower end of said plug presenting a concave seat conforming substantially to the shape of the ball and in which a substantial part of the ball is seated, said ball being firmly attached and closely adherent to the walls of said seat by a thin film of fusible material, whereby the connection is sensitively responsive to the fusing heat to cause the ball to drop to its seat while being normally held effectively against dislodgment due to mechanical shocks.

In testimony whereof, I have signed my name to this specification.

LYNN H. MORSE.